Oct. 21, 1924.
J. BORDAS
TIRE BLOW-OUT BOOT
Filed Oct. 8, 1923
1,512,081
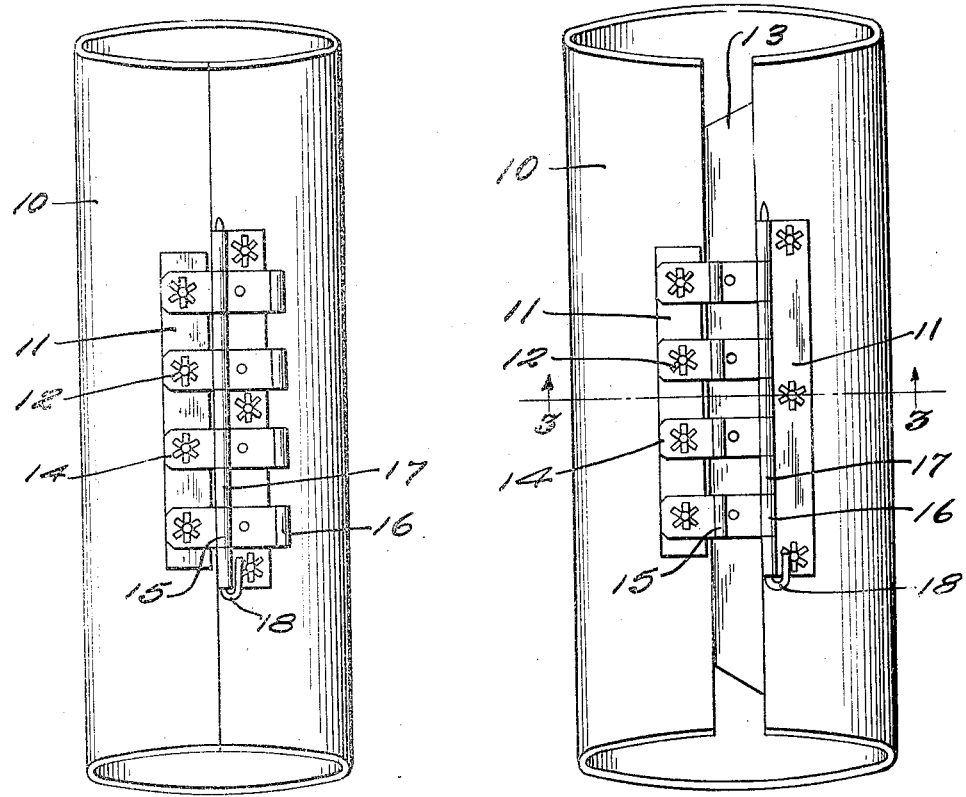
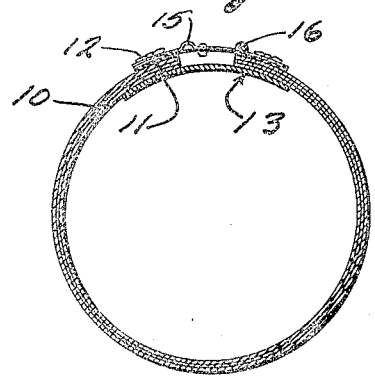
John Bordas.
Inventor Patented Oct. 21, 1924.

1,512,081

UNITED STATES PATENT OFFICE.

JOHN BORDAS, OF MIAMI, FLORIDA.

TIRE BLOW-OUT BOOT.

Application filed October 8, 1923. Serial No. 667,291.

*To all whom it may concern:*

Be it known that I, JOHN BORDAS, a citizen of the United States, residing at Miami, in the county of Dade and State of Florida, have invented certain new and useful Improvements in a Tire Blow-Out Boot, of which the following is a specification.

This invention relates to improvements in adjustable tire patches and has for its principal object to provide a device of this character which may be easily and effectively placed in a punctured casing and adjustably locked therein to prevent the spreading of the punctured portion of the casing when the tire is inflated.

Another object of the invention is to provide an adjustable tire patch with means for holding the same in place without mutilating the inner tube and adjustable locking means for hingedly connecting the meeting portions of the patch together so that the same will hold the inner tube spaced from the punctured portion of the casing.

A further object of the invention is to provide an adjustable tire patch having a strip of fabric cemented or otherwise secured to one of the meeting portions of the patch and designed to extend across the open end of the patch for preventing the accumulation of foreign matter such as dirt or sand for preventing any danger of blowouts.

A still further object of the invention is to provide an adjustable locking patch with metallic plates which have bearing members formed therein for the reception of a locking pin for securely holding the meeting portions of the patch in locked position in a punctured casing.

Other objects of the invention will be better understood from the following detailed description and more particularly pointed out in the appended claims wherein:—

Figure 1 is a plan view of the invention shown in locked position.

Figure 2 is a similar view shown in open position, and

Figure 3 is a sectional view taken on line 3—3 of Figure 2.

Referring now to the drawing wherein like characters of reference denote corresponding parts, the numeral 10 indicates the body of an adjustable tire patch formed from a plurality of layers of fabric. The patch is provided at the meeting edges thereof with metallic plates 11 which are effectively secured thereto by means of rivets or the like as indicated by the numeral 12.

Extending across the meeting edges of the patch at the inside thereof is a fabric strip 13 which is cemented or otherwise secured to one side of the patch and the free end thereof extends beyond the remaining end of said patch for preventing the accumulation of dust or dirt from gaining access to the inner tube and thereby eliminating the pinching of the inner tube or the possibility of causing a defect therein which would possibly develop a blowout.

On one of the metallic plates is secured a plurality of small plates 14 by means of the rivet members and have bearings or eyes 15 formed intermediate their ends and also bearing members 16 formed at the extreme outer end thereof for engaging the bearing members 17 formed on the opposite plate and by the corresponding engagement of these bearing members the pin 18 is passed through for the purpose of locking the patch within a casing. By the provision of a pair of bearings or eyes formed on each of the plates 14 one in rear of the other, the blowout patch may be readily and conveniently adjusted for use on tires of various sizes.

In view of the foregoing description of my invention taken in connection with the accompanying drawing, it is thought that any further explanation as to the construction, operation and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim is:—

1. A tire patch of the class described comprising a body formed of a plurality of fabric strips, metallic plates secured to the meeting edges of said patch, a fabric strip secured to the inner wall thereof and extending across the open edges of the patch, a plurality of small plates securely connected to one of the metallic plates and having a plurality of bearing members formed intermediate their ends and at the extreme outer end thereof for correspondingly engaging the bearing members formed on the opposite plate and means for securely locking the patch upon a casing.

2. An adjustable tire patch comprising a fabric body having meeting edges, a series of eyes attached to one edge, a series of plates projecting from the other edge, a plurality of eyes arranged on each plate one in rear of the other, and means for engaging through one eye on each plate and the eyes on the opposite edge for locking the patch in adjusted position.

3. An adjustable tire patch comprising a fabric body, a plurality of eyes arranged in a longitudinal row on each of the meeting edges of said patch, a second row of eyes arranged on one of the edges of said patch in rear of the first mentioned row, and means engaging through the single row of eyes on one edge and through one of the rows on the other edge for locking the patch in desired adjusted position.

4. An adjustable tire patch comprising a fabric body, metallic plates secured thereto, a protector flap secured within said body to provide a cover, small elongated plates secured to one of the metallic plates, said small plates having bearing members for correspondingly engaging bearing members formed on the other metallic plate and a locking pin engaging said bearing members for locking the device within a punctured tire.

In testimony whereof, I have affixed my signature in the presence of two witnesses.

JOHN BORDAS.

Witnesses:
Thos. P. Benson,
Elmer Wetzel.